Dec. 28, 1965  W. B. HALL, JR  3,225,561
REFRIGERATING APPARATUS
Filed Jan. 29, 1965  2 Sheets-Sheet 1

INVENTOR.
Walter B. Hall, Jr.
BY
Carl A. Stickel
HIS ATTORNEY

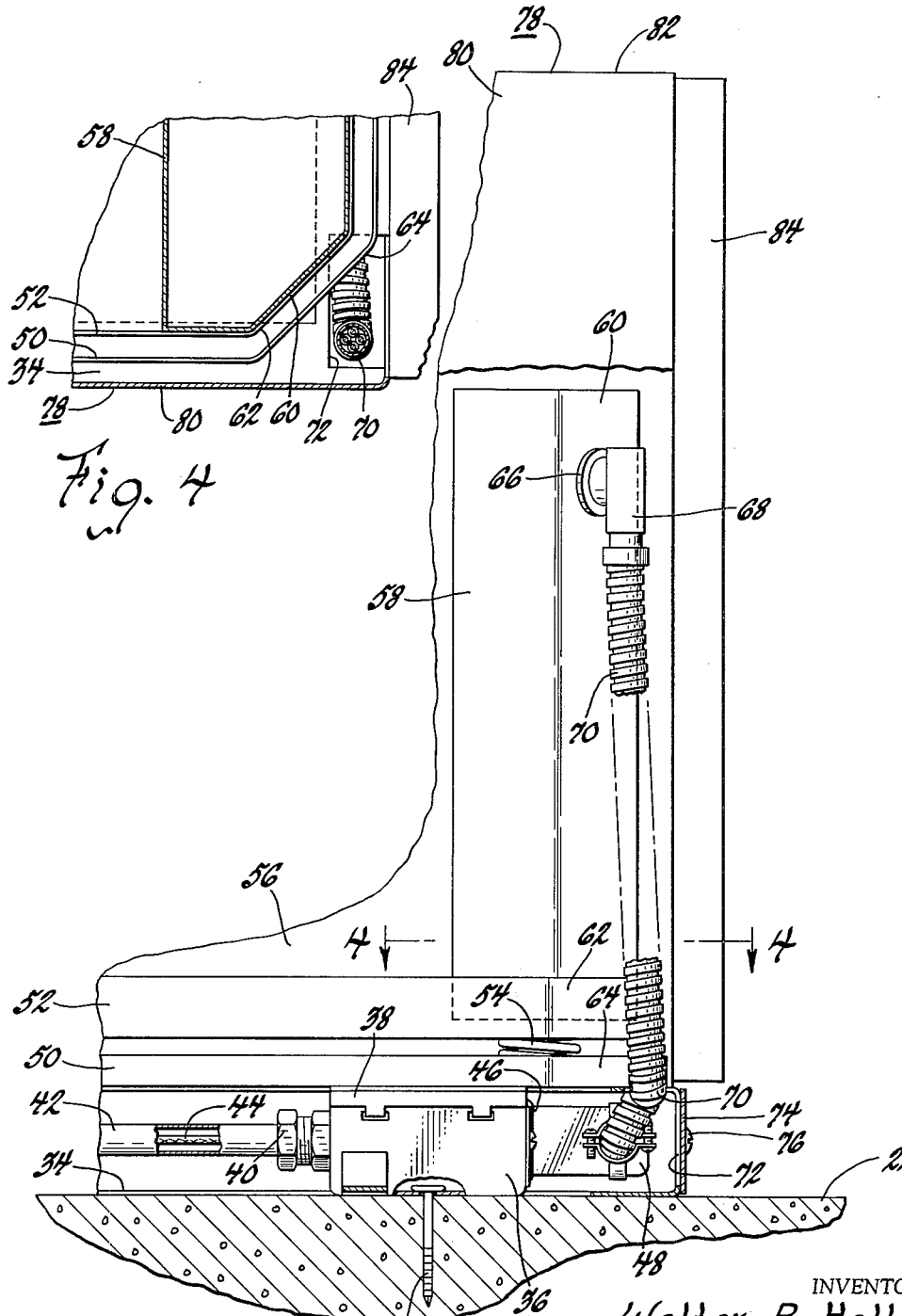

United States Patent Office 3,225,561
Patented Dec. 28, 1965

3,225,561
REFRIGERATING APPARATUS
Walter B. Hall, Jr., Bellbrook, Ohio, assignor to General Motors Corporation, Detroit, Mich., a corporation of Delaware
Filed Jan. 29, 1965, Ser. No. 428,979
7 Claims. (Cl. 62—262)

This invention pertains to refrigerating apparatus and more particularly to the mounting of air conditioning units.

Window air conditioners are recognized as practical, inexpensive expedients for obtaining air conditioning. They are made in large volume in many sizes and are sold at a relatively low cost. However, their planned location in a window has many undesirable aspects. No matter how ornamental is the exterior of the cabinet, it still introduces a lack of harmony with respect to other windows in the same and adjacent rooms when viewed from the interior. Also there is a lack of harmony with respect to other windows on the same side of the house or building when the house or building is viewed from the exterior.

In addition to the objectionable appearance, the window air conditioners reduce the transmission of light through the window and the circulation of the air by the window air conditioner may gradually apply a coating of dust and lint to the curtains and drapes. The window air conditioners also interfere with the normal use of the windows preventing the normal opening and closing thereof for various purposes. The mounting and sealing of the window air conditioners in the window opening may also be a problem.

In some houses and buildings special sleeves and apertures have been provided for window type air conditioners in the structural walls thereof to avoid these and other objections to the use of the windows. This, however, is not feasible with some other types of walls, especially those having insufficient structural strength for supporting a window type air conditioner.

It is an object of this invention to provide a neat, attractive arrangement for mounting a window type room air conditioner on a floor which will conceal the electrical connections and which will cooperate with a suitable opening or duct in the exterior wall for the disposal of heat.

It is another object of this invention to provide a neat and attractive arrangement for mounting a window type room air conditioner on the floor which will conceal the electrical connections with remote controls and provide ease of removal and replacement of the window type room air conditioner.

These and other objects are attained in the form shown in the drawings in which a U-shaped base is provided which can be readily nailed or otherwise secured to the floor and which also has in it the electrical supply connection and an electrical terminal box and receptacle for receiving the plug in connection from the window type room air conditioning unit. An inverted U-shaped housing extends over and is fastened to the base and covers the top and sides of the window type room air conditioning unit which is mounted for slidable insertion and removal on the base within the housing. The housing is provided with an easily removable front grill member which may be removed for removal and replacement of the window type room air conditioning unit. The base is cut out in front of the receptacle and a corner of the window type room air conditioner is chamfered to provide for the connection between the window type room air conditioning unit and the plug-in terminal connecting to the receptacle in the base. The cut-out portion is normally covered by a removable plate. The rear of the housing extends through an opening in the ralatively thin nonstructural outside wall for dissipating the heat from the compressor and condenser to the outside atmosphere. The top of the housing may be used as a stand for any object normally placed in such a room.

Further objects and advantages of the present invention will be apparent from the following description, reference being had to the accompanying drawings wherein a preferred embodiment of the present invention is clearly shown.

In the drawings:

FIG. 3 is an enlarged fragmentary vertical sectional view showing a portion of the base in vertical section; and FIG. 4 is a fragmentary horizontal sectional view taken along the line 4—4 of FIG. 3.

Figure 2:
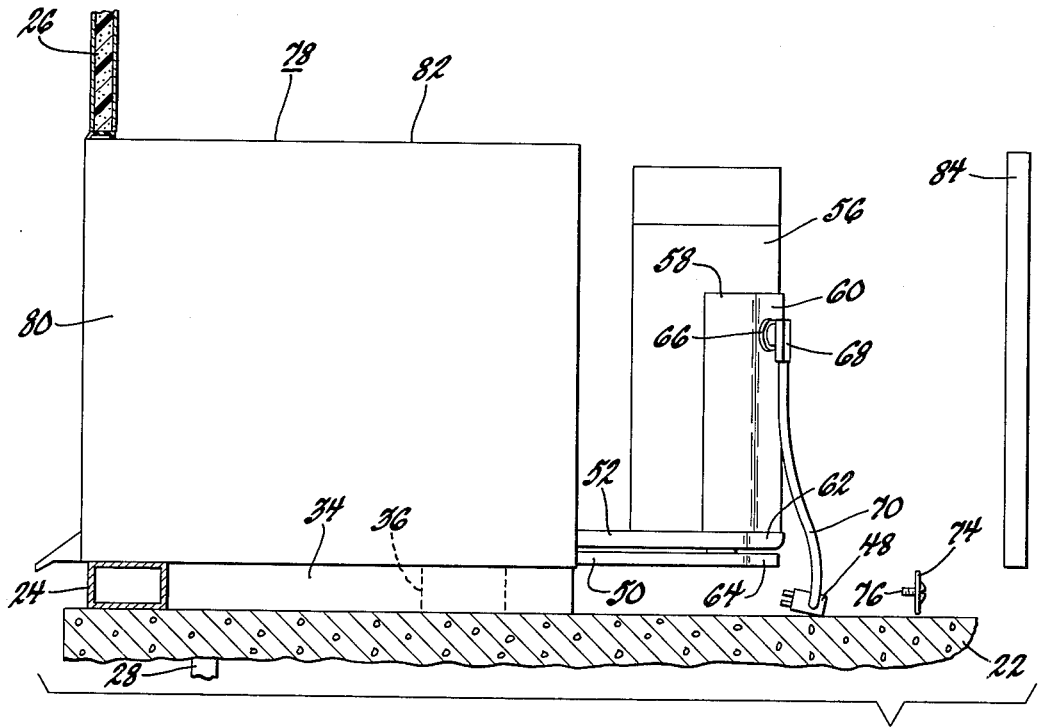
FIG. 2 is an exploded vertical sectional view similar to FIG. 1 showing an exploded arrangement in which the grill member is removed and the window type room air conditioning unit is partially removed from the housing and a cover plate is removed from the base.
Figure 1:
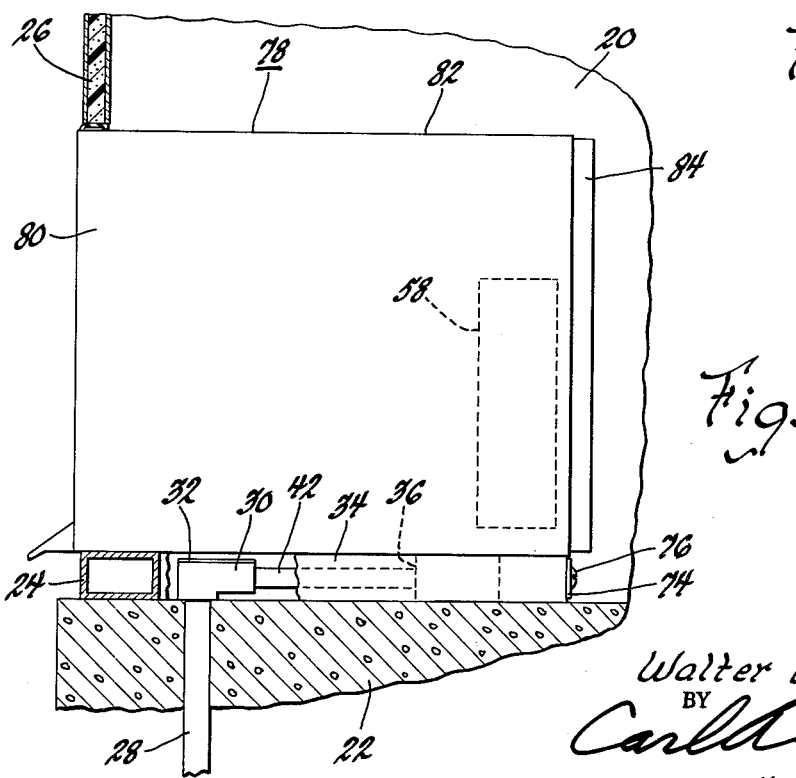
FIG. 1 is a vertical sectional view through a portion of a room including the floor and a wall portion thereof illustrating a window type room air conditioner and supporting structure embodying one form of my invention.

Referring now to the drawings, there is shown a portion of a room 20 which may be provided with any suitable type of floor such as a concrete slab floor 22 having box-shaped sills 24 which support the thin vertical insulating outer walls 26, which have little structural strength and are incapable of supporting any substantial load. For the electrical supply, the conductors extend from suitable remote electrical control devices through the steel pipe 28 to the right angle fitting 30 having a removable top 32. According to my invention, there is provided a generally U-shaped base 34 having the rear portion fitting against the sill 24. The base 34 is substantially the same height as the sill 24 and is in itself U-shaped in cross section with the interior of the U facing inwardly.

Fastened within and concealed within the U-shaped base 34 is the electrical steel connector box 36 having a removable cover 38. The base 34 is fastened to the floor 22 by various fastening devices such as several cement nails 86, one of which may pass through an aperture in the bottom of the box 36. At the rear it is provided with connecting fittings 40 for connection to the pipe conduit 42 containing the electrical conductors 44 extending rearwardly to the fitting 30. This terminal box 36 is provided with a front facing receptacle 46 adapted to receive the plug-in terminal 48.

The window type room air conditioning unit is provided with a pair of longitudinal support members 50 which are slidably mounted upon the top of the U-shaped base 34. The base 52 of the room air conditioning unit is resiliently mounted on the members 50 through the use of a plurality of compression type coil springs 54. The complete air conditioning unit is not shown in detail since it is not necessary for the understanding of the invention. However, the room air conditioning unit may be like that shown in patents:

2,806,361, issued September 17, 1957
2,904,972, issued September 22, 1959
2,945,362, issued July 19, 1960
2,987,984, issued June 13, 1961
2,989,855, issued June 27, 1961

In the window type room air conditioning unit illustrated, there is shown at the front of the base 52 an evaporator housing 56 and a control housing 58. The front corner of the controlling housing 58 is beveled to provide the beveled side 60 while the base 52 is provided with a beveled corner 62 and the adjacent longitudinal support member 50 is likewise provided with a beveled front 64.

The beveled face 60 of the control housing 58 is provided with a receptacle 66 receiving a terminal plug connector 68 connected through a flexible electrical conduit 70 with the terminal 48. Through this arrangement the window type room air conditioner is supplied with electrical energy. The U-shaped base 34 has a portion of its upper flange cut out to form the opening 72 to provide for the passage of the conduit 70 between the receptacle 66 and the terminal 68 above and the terminal 48 and the receptacle 46 in the base 34. This opening continues through the web or front of the U-shaped base 34 as illustrated in FIG. 3. This opening is normally closed by a metal cover 74 fastened in place by the screws 76.

Fastened to the base 34 is an inverted U-shaped ornamental housing 78 having two sides 80 and a connecting top 82 which surrounds the sides and top of the room air conditioning unit which is slidably mounted on the base 34. The front of the housing and the room air conditioning unit is concealed and to a limited extent enclosed by a front grille member 84 which may be fastened by any suitable means such as a press fit to the front of the housing 78. The conduit 70 passes behind the grille 84 and particularly between the grille 84 and the electrical box 58, the base 52 of the window type room air conditioning unit, and the support member 50. The grille also conceals from view the opening 72 with the exception of the portion which is closed by the cover 74.

With this arrangement all of the electrical connections are effectively concealed from view and arranged so that they may not be readily tampered with. The window type room air conditioning unit may be readily removed for servicing, repair or replacement as illustrated best in FIG. 2. All that is required is the removal of the screw 76 and the cover 74 as well as the grille member 84. When this is done, the terminal 48 may be easily removed from the receptacle 46 and the entire window type room air conditioning unit may be slid out the front on the supports 50 as illustrated in FIG. 2 onto a low bed truck or any suitable conveyance. Thus a very simple desirable arrangement is provided for employing a window type room air conditioning unit without placing it in a window. The air from the room is drawn in through the grille member 84 by the air conditioning unit, cooled and then returned through the grille member 84 back into the room. The housing 78 and the grille member 84 may be provided with any suitable finish which will provide artistic harmony with the decorations of the room.

While the embodiment of the present invention as herein disclosed, constitutes a preferred form, it is to be understood that other forms might be adopted.

What is claimed is as follows:

1. A structure for mounting an air conditioning unit upon a floor including a base having front and side walls, an electrical receptacle located within and fastened to the base behind the front thereof, the front of the base having a removable portion in front of said receptacle, a housing supported by and fastened to said base extending upwardly from said side walls and having a top extending laterally over said base.

2. A structure as specified in claim 1 in which the receptacle faces the front and has at the rear an electrical connection for connecting to an electrical supply.

3. An air conditioner including a base having sides and a front adapted to be mounted upon a floor, a housing fastened to the base having side walls extending upwardly from said sides and a top wall extending laterally between the top of the side walls, a removable air conditioning unit removably mounted in said housing above said base, a removable front grille member covering the front of said housing and said air conditioning unit, an electrical receptacle located within and fastened to said base behind the front thereof beneath said housing and air conditioning unit, said unit having electrical conductor means extending downwardly behind said front grille and provided with an electrical plug terminal removably connecting with said electrical receptacle.

4. An air conditioner as specified in claim 3 in which the base is provided with a removable front portion in front of the receptacle.

5. An air conditioner as specified in claim 3 in which the base is provided with a removable front portion in front of the receptacle and the receptacle faces the front and has at the rear an electrical connection for connecting to an electrical supply.

6. An air conditioner as specified in claim 3 in which the base is U-shaped in cross section with the interior of the U facing inwardly and has an opening in top and front portion of the cross sectional U-shape in front of said receptacle for easy separation of the electrical plug terminal from the electrical receptacle coincidentally to the removal of the air conditioning unit from the housing, said base being provided with a removable cover for concealing said open portion of said base in front of said receptacle.

7. An air conditioner including a base having sides and a front adapted to be mounted upon a floor, a housing fastened to the base having side walls extending upwardly from said sides and a top wall extending laterally between the top of the side walls, a removable air conditioning unit removably mounted in said housing above said base, a removable front grille member covering the front of said housing and said air conditioning unit, an electrical terminal box located within the confines of said base and having at the front an exposed electrical terminal and having at the rear an electrical conduit connection for connection to an electrical supply, said unit having electrical conductor means extending downwardly behind said front grille and provided with an electrical plug terminal removably connecting with said electrical receptacle.

References Cited by the Examiner

UNITED STATES PATENTS

| 1,975,859 | 10/1934 | Nelson | 62—262 |
| 2,105,205 | 1/1938 | Steinfeld | 62—262 |
| 2,130,327 | 9/1938 | Gulson | 62—262 |
| 2,268,186 | 12/1941 | Candor | 62—262 |

WILLIAM J. WYE, *Primary Examiner.*